United States Patent [19]

Ness

[11] 4,083,428
[45] Apr. 11, 1978

[54] PLUNGER FOR HAND GREASE GUNS

[75] Inventor: Kenneth P. Ness, Minneapolis, Minn.

[73] Assignee: K-P Manufacturing Co., Inc., Minneapolis, Minn.

[21] Appl. No.: 755,239

[22] Filed: Dec. 29, 1976

[51] Int. Cl.² .......................... G01F 11/00; F16J 9/00
[52] U.S. Cl. .................................. 184/105 A; 92/240; 222/256; 222/326
[58] Field of Search ............... 184/105 A, 37, 38 R, 184/38 A, 38 B, 38 C; 222/326, 256, 260, 386.5, 390, 391; 277/212 R, 212 C, 212 F; 92/240, 249

[56] References Cited

U.S. PATENT DOCUMENTS

| 1,430,723 | 10/1922 | Chilson | 92/240 |
| 1,540,978 | 6/1925 | Barthel | 184/38 R |
| 2,886,215 | 5/1959 | Klein et al. | 222/326 X |
| 3,038,768 | 6/1962 | Kludt | 277/212 C |
| 3,215,320 | 11/1965 | Heisler et al. | 222/391 |
| 3,501,063 | 3/1970 | Sundholm | 222/326 |
| 3,655,101 | 4/1972 | Dorn | 222/326 |

Primary Examiner—David H. Brown
Attorney, Agent, or Firm—Merchant, Gould, Smith, Edell, Welter & Schmidt

[57] ABSTRACT

A grease gun plunger of elastic material formed to provide a central hub, a peripheral skirt, and a web joining the skirt to said hub, the web being unitary with said hub at a first end of the plunger and with the skirt at a second end of the plunger to comprise a generally conical partition across the plunger. The skirt has an outer surface which tapers inwardly in both axial directions from a location of maximum outside diameter near the second end of the plunger. The plunger has a peripheral groove around said second end, said groove having a radial dimension substantially equal to the radial thickness of said skirt.

7 Claims, 7 Drawing Figures

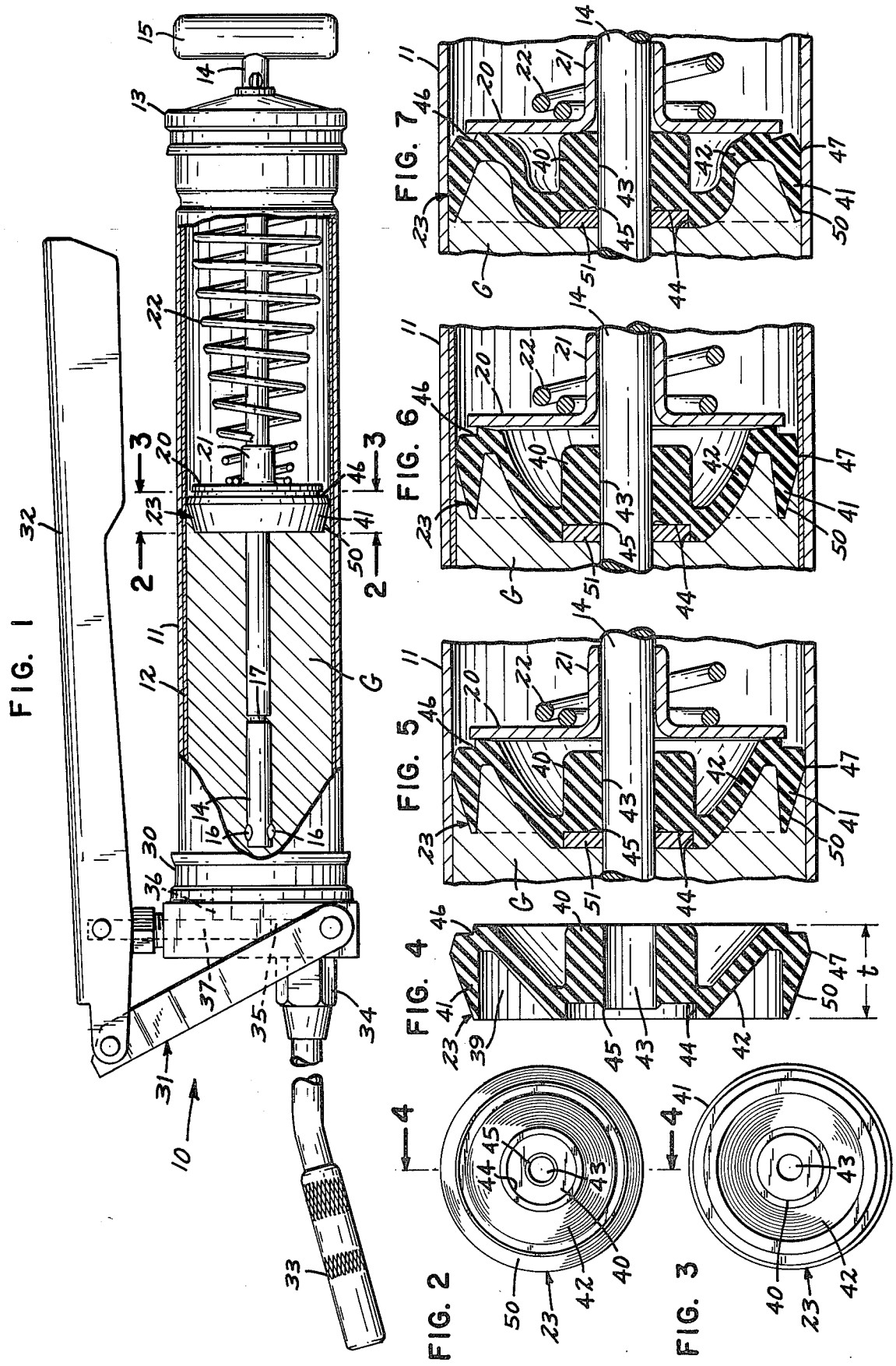

PLUNGER FOR HAND GREASE GUNS

BACKGROUND OF THE INVENTION

This invention pertains to the general field of lubrication, and specifically comprises a new and improved plunger for use as a piston in grease guns and like applications.

The art of grease guns is one in which much inventive activity has taken place. In Helgerud U.S. Pat. No. 3,780,830, assigned to the assignee of the present application, the general nature of a grease gun is clearly disclosed, and it is taught that when the gun is filled with grease a spring acts on a plunger at one end of the gun to urge the mass of grease toward the other end, where a simple reciprocating pump is located for manual operation to first clear a subordinate chamber for filling with grease from the gun and then force a piston into the chamber for expelling the grease under high pressure past a suitable check valve to the fitting being lubricated. The gun may be filled either by use of prepared cylindrical grease cartridges or from a bulk supply of grease, and accordingly the plunger must be capable of tightly engaging either with the inner wall of the gun itself, or with the slightly smaller inner wall of a grease cartridge, being neither too tight to function properly in the cartridge nor so loose as to permit bypassing of bulk grease in the cylinder. Known plungers have not proved satisfactory for this use.

SUMMARY OF THE INVENTION

The present invention comprises an elastic plunger of special configuration, so designed that the forces inherent in its use are likewise inherently effective to increase and perfect the seal between the plunger and the wall of the gun or cartridge in which it is operating. The new plunger has a central hub joined to a peripheral skirt by a generally conical web. The web is deformed by insertion of the plunger into the cylinder so as to cooperate with the grease being dispensed and with the pressure plate acting on the plunger to give a greatly increased peripheral sealing through a range of plunger diameters including both the diameter of the cylinder and that of the cartridge. Also a part of the invention is the combination of the new plunger with a gun adapted to use it.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawings,

FIG. 1 is a view of a grease gun incorporating my invention, parts being broken away for clarity of illustration;

FIG. 2 is a view in end elevation of a plunger removed from the grease gun and as viewed from the line 2—2 of FIG. 1;

FIG. 3 is a view in elevation of the plunger of FIG. 2 removed from the grease gun and as viewed from the line 3—3 of FIG. 1;

FIG. 4 is an enlarged axial sectional view of the plunger taken on the line 4—4 of FIG. 2;

FIG. 5 is a view like FIG. 4 showing the plunger installed in the cylinder of a grease gun;

FIG. 6 is a view like FIG. 4 showing the plunger installed in a grease cylinder cartridge mounted within the cylinder of a grease gun; and FIG. 7 is a view like FIG. 5 showing the plunger during filling of the gun from a high pressure grease line.

DESCRIPTION OF THE PREFERRED EMBODIMENT

FIG. 1 shows a grease gun 10 according to my invention, comprising a cylinder 11 containing a grease cartridge 12 with grease G. At one end, cylinder 11 is closed by a cap 13 threaded or otherwise secured thereto and centrally bored to pass a rod 14 carrying at one end a T handle 15. Rod 14 extends into cylinder 11, where its other end is deformed or otherwise enlarged at 16. Inward from its end, rod 14 is provided with a groove 17 sized to fit the thickness of cap 13.

A pressure plate 20 having a central hub 21 is slidably carried on rod 14, and engages the small end of a generally conical compression spring 22: the larger end of spring 22 engages the inner surface of cap 13. Also slidable on rod 14 is a plunger 23 which will be described more fully below.

At its other end, cylinder 11 is removably secured to a second cap 30 which includes a pressure pump 31 actuated by a handle 32 to expel grease out at a nozzle 33, the grease being supplied to the chamber 35 of the pump from cylinder 11 through a suitable hole 36 in cap 30 when the piston 37 is withdrawn. Nozzle 33 may include a conventional check valve suggested at 34 to prevent grease expelled by the pump from being drawn back into the pump on its next stroke.

Plunger 23 comprises a central hub 40 and an outer skirt 41 interconnected by a web 42. The axial thickness "t" of hub 40 is the same as that of skirt 41. Hub 40 is provided with a bore 43 to slide on rod 14 in a quite close fit, and has a counterbore 44 with a slight annular rib 45 surounding bore 43. The thickness of web 42 is much less than the dimension $t$, and the web is configured as a generally conical partition extending from the hub at a first axial end of the plunger to the skirt at the other axial end to define an annular channel 39 of continuously decreasing cross sectional area. At the second axial end the plunger is formed with a peripheral groove 46 extended inward radially by a distance generally of the same as the wall thickness of skirt 41. Skirt 41 tapers in both axial directions from a location of maximum diameter 47, where it is in fact slightly larger than the cylinder 11. Location 47 is nearer the second end of the plunger than the first end: in the direction toward the first end the skirt tapers at 50 almost to a feather edge.

A protective washer 51 is received in counterbore 44 to prevent damage to bore 43 by deformation 16, and cooperates with rib 45 to provide a seal against passage of grease through the plunger around rod 14. Members 20, 23, and 51 may be referred to as a plunger assembly.

OPERATION

In use, handle 15 is pulled to the right. Rod 14 slides in bore 43 until the enlarged end 16 of the rod engages washer 51, whereupon plunger 23 is also drawn to the right, compressing spring 22. Groove 17 engages the rim of the opening in cap 13, maintaining spring 22 compressed. When this has been done, cap 30 may be removed and a cartridge of grease may be inserted.

After cap 30 is replaced, handle 14 may be freed in cap 13, and spring 22 pushes plunger 23 against the grease to create some pressure in the cartridge. Rod 14 is so slender that it can be thrust home in the cartridge without appreciable change in the cartridge pressure.

To perform a lubrication operation, nozzle 33 is applied to the fitting to be lubricated, and handle 32 is drawn out laterally from the gun until piston 37 clears hole 36, permitting grease to be expelled into the pump chamber 35 by action of spring 22. Opposite movement of handle 32 causes piston 37 to close off hole 36 and then to force the chamber full of grease out past check valve 34 into nozzle 33, and this process may be continued until spring 22 and plunger 23 have expelled all the grease through hole 36 to be dispensed by the pump.

Attention is again directed to FIGS. 4–6 which show the performance of plunger 23 in an exaggerated way. By itself, the plunger has a web 42 which is substantially conical. When it is compressed into cylinder 11 alone, web 42 takes on a curvilinear pattern in section, the overall axial length of the plunger also increasing slightly. If the plunger is used within the still slightly smaller diameter of a cartridge, the curvature of the web in section becomes more pronounced, and the outside axial dimension of the plunger becomes greater. Note that in FIGS. 5 and 6 pressure plate 20 does not contact plunger 23 at hub 40, but only around the rim behind skirt 23: this tends to force the skirt more tightly into contact with the wall, and thus prevent by-passage of grease.

When a grease cartridge is not used, the gun may be prepared as before and then filled manually upon removal of cap 30. A more convenient way of bulk filling is by temporary replacement of nozzle 33 and check valve 34 by a fitting which can be coupled to a high pressure grease line by which grease is forced backward through pump 31 into cylinder 11. The pressure available in hydraulic grease lines is so great that there is danger of forcing grease past plunger 23 into the spring chamber of the gun: plunger 23 is specially designed to minimize this danger, as is shown in FIG. 7. As is there made clear, a greatly increased hydraulic pressure in the cylinder forces skirt 23 into substantially full contact with the wall, so that the greater the grease pressure, the tighter the seal at feather edge of taper 50. The provision of groove 46 is shown to facilitate the distortion of the plunger to accomplish this seal.

From the foregoing, it will be evident that I have invented a new lubricating arrangement wherein a plunger of special design is operative in the cylinder of the gun itself and also in the cylinder of an insertable grease cartridge, and acts automatically in a self-sealing fashion to increase its resistance to leakage when the pressure in the cylinder becomes markedly greater than usual during filling from a high pressure grease line.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. In a hand grease gun adapted to use both cartridge-packed and bulk-filled greases, said gun including a cylindrical barrel of known inside diameter extending between forward and rearward ends, an axially extending plunger guide rod, and means, including a pressure plate, coaxial with said rod for resiliently applying axial pressure therealong, the improvement which consists of a plunger assembly including a cylindrical plunger of homogeneous, flexible, elastic material for use as a sliding seal in said barrel, said plunger comprising:
   a peripheral hollow skirt having a predetermined axial dimension;
   a central hub having said predetermined axial dimension and an axial bore to pass said guide rod, and connected to said skirt only at one axial end thereof;
   and a web, of thickness less than said predetermined axial dimension, unitary with said hub at a first, forward end of said plunger and unitary with said skirt at a second, rearward end of said plunger, to comprise a generally conical partition across said plunger which is the only support for said skirt,
   the thickness of said skirt decreasing inwardly in both axial directions from a location of maximum outside diameter, greater than said known inside diameter of said barrel, near said second end of said plunger,
   and said plunger having a peripheral groove around said second end thereof, of radial dimension substantially equal to the radial thickness of said skirt.

2. In a hand grease gun adapted to use both cartridge-packed and bulk-filled greases, said gun including a cylindrical barrel of known inside diameter extending between forward and rearward ends and an axially extending plunger guide rod, the improvement which consists of a plunger assembly including a cylindrical plunger of homogeneous, flexible, elastic material for use as a sliding seal in said barrel, said plunger comprising:
   a peripheral hollow skirt having a predetermined axial dimension;
   a central hub having said predetermined axial dimension and an axial bore to pass said guide rod, and connected to said skirt only at one axial end thereof;
   and a web, of thickness less than said predetermined axial dimension, unitary with said hub at a first, forward end of said plunger and unitary with said skirt at a second, rearward end of said plunger, to comprise a generally conical partition across said plunger which is the only support for said skirt,
   the thickness of said skirt decreasing inwardly in both axial directions from a location of maximum outside diameter, greater than said known inside diameter of said barrel, near said second end of said plunger.

3. The structure of claim 2 in which said skirt tapers in thickness toward said first end of said plunger substantially to a feather edge.

4. The structure of claim 2 in which said hub and said skirt coact to define an annular chamber which decreases in cross sectional area with distance from said first end of said plunger.

5. A grease gun adapted to use both cartridge-packed and bulk-filled grease comprising, in combination:
   a cylindrical barrel of known inside diameter extending between a forward end cap and a rearward end cap;
   a plunger guide rod carried in said rearward cap and extending axially in said barrel;

a pressure plate slidable on said rod in said barrel;

a compression spring in said barrel acting between said rearward cap and said pressure plate;

and a plunger, of homogeneous, flexible, elastic material, engaged by said pressure plate and slidable on said rod in sealing engagement with said barrel, said plunger comprising,

- a peripheral hollow skirt having a predetermined axial dimension;
- a central hub having said predetermined axial dimension and an axial bore to pass said guide rod, and connected to said skirt only at one axial end thereof;
- and a web, of thickness less than said predetermined axial dimension, unitary with said hub at a first, forward end of said plunger and unitary with said skirt at a second, rearward end of said plunger, to comprise a generally conical partition across said plunger which is the only support for said skirt,
- the thickness of said skirt decreasing inwardly in both axial directions from a location of maximum outside diameter, greater than said known inside diameter of said barrel, near said second end of said plunger,
- and said plunger having a peripheral groove around said second end thereof, of radial dimension substantially equal to the radial thickness of said skirt.

6. A cylindrical plunger of homogeneous, flexible, elastic material for use as a sliding seal in a cylindrical chamber, said plunger comprising:

- a peripheral hollow skirt having a predetermined axial dimension;
- a central hub having said predetermined axial dimension, and connected to said skirt only at one axial end thereof;
- and a web, of thickness less than said predetermined axial dimension, unitary with said hub at a first, forward end of said plunger and unitary with said skirt at a second, rearward end of said plunger, to comprise a generally conical partition across said plunger which is the only support for said skirt,
- the thickness of said skirt decreasing inwardly in both axial directions from a location of maximum outside diameter near said second end of said plunger.

7. A plunger according to claim 6 having a peripheral groove around said second end thereof, of radial dimension substantially equal to the radial thickness of said skirt.

* * * * *